(12) United States Patent
Zheng et al.

(10) Patent No.: US 10,773,218 B2
(45) Date of Patent: Sep. 15, 2020

(54) SELECTIVELY PERMEABLE GRAPHENE OXIDE ELEMENT

(71) Applicant: NITTO DENKO CORPORATION, Osaka (JP)

(72) Inventors: Shijun Zheng, San Diego, CA (US); Peng Wang, San Diego, CA (US); Rebecca Romero, Escondido, CA (US); Isamu Kitahara, San Diego, CA (US); Weiping Lin, Carlsbad, CA (US)

(73) Assignee: NITTO DENKO CORPORATION, Osaka (JP)

( * ) Notice: Subject to any disclaimer, the term of this patent is extended or adjusted under 35 U.S.C. 154(b) by 92 days.

(21) Appl. No.: 15/915,459

(22) Filed: Mar. 8, 2018

(65) Prior Publication Data

US 2018/0193806 A1 Jul. 12, 2018

Related U.S. Application Data

(63) Continuation-in-part of application No. PCT/US2016/051101, filed on Sep. 9, 2016.
(Continued)

(51) Int. Cl.
*B01D 53/22* (2006.01)
*B01D 69/14* (2006.01)
(Continued)

(52) U.S. Cl.
CPC ......... *B01D 69/148* (2013.01); *B01D 53/228* (2013.01); *B01D 53/268* (2013.01);
(Continued)

(58) Field of Classification Search
CPC ............ B01D 53/268; B01D 2256/245; B01D 2257/80; B01D 2256/16; B01D 71/021;
(Continued)

(56) References Cited

U.S. PATENT DOCUMENTS

| 4,772,392 A | 9/1988 | Sanders, Jr. et al. |
| 4,783,201 A | 11/1988 | Rice et al. |

(Continued)

FOREIGN PATENT DOCUMENTS

| CA | 2998153 B2 | 3/2017 |
| CN | 102600734 B | 12/2014 |

(Continued)

OTHER PUBLICATIONS

"Water vapor" The American Heritage Student Science Dictionary, 2nd edition, 1 page, 2014, Houghton Mifflin Harcourt Publishing Company. <https://www.thefreedictionary.com/water+vapor> (Year: 2014).*

(Continued)

*Primary Examiner* — Anthony R Shumate
(74) *Attorney, Agent, or Firm* — Maschoff Brennan; Brent A. Johnson; David W. Old

(57) ABSTRACT

Described herein is a graphene material such as graphene oxide and polymer based selectively permeable element that provides selective permeability between polar and non-polar molecules such as fluid, gas or vapor. The methods for making these selectively permeable elements and related devices are also described.

19 Claims, 2 Drawing Sheets

Related U.S. Application Data

(60) Provisional application No. 62/216,938, filed on Sep. 10, 2015, provisional application No. 62/292,136, filed on Feb. 5, 2016.

(51) Int. Cl.
| | |
|---|---|
| *B01D 53/26* | (2006.01) |
| *B01D 71/38* | (2006.01) |
| *B01D 61/36* | (2006.01) |
| *B01D 67/00* | (2006.01) |
| *C01B 32/198* | (2017.01) |
| *B01D 71/02* | (2006.01) |
| *C08J 3/24* | (2006.01) |

(52) U.S. Cl.
CPC ......... *B01D 61/36* (2013.01); *B01D 67/0079* (2013.01); *B01D 71/024* (2013.01); *B01D 71/38* (2013.01); *C01B 32/198* (2017.08); *C08J 3/247* (2013.01); *B01D 71/021* (2013.01); *B01D 2256/10* (2013.01); *B01D 2256/12* (2013.01); *B01D 2256/16* (2013.01); *B01D 2256/24* (2013.01); *B01D 2256/245* (2013.01); *B01D 2257/80* (2013.01); *B01D 2258/06* (2013.01); *C08J 2329/04* (2013.01)

(58) Field of Classification Search
CPC ........... B01D 2256/24; B01D 2258/06; B01D 53/228; B01D 69/148; B01D 2256/12; B01D 2256/10; B01D 71/38; B01D 71/024; C01B 32/198; C08J 2329/04; C08J 3/247

See application file for complete search history.

(56) References Cited

U.S. PATENT DOCUMENTS

| | | | | |
|---|---|---|---|---|
| 4,900,626 | A | 2/1990 | Fabre | |
| 6,805,730 | B2 | 10/2004 | Herezeg | |
| 9,527,043 | B2* | 12/2016 | Choi | B01D 53/228 |
| 9,533,265 | B2* | 1/2017 | Choi | B01D 71/021 |
| 2011/0256376 | A1* | 10/2011 | Compton | B32B 9/04 |
| | | | | 428/220 |
| 2012/0305075 | A1* | 12/2012 | Ford | H01L 31/0384 |
| | | | | 136/257 |
| 2014/0011027 | A1* | 1/2014 | Kim | D02J 13/00 |
| | | | | 428/367 |
| 2014/0272350 | A1 | 9/2014 | Kim et al. | |
| 2014/0370246 | A1* | 12/2014 | Hurt | B05D 5/00 |
| | | | | 428/189 |
| 2015/0118468 | A1* | 4/2015 | Chen | C08J 7/047 |
| | | | | 428/220 |
| 2015/0165389 | A1 | 6/2015 | McGenniss et al. | |
| 2015/0231577 | A1 | 8/2015 | Nair et al. | |
| 2015/0344643 | A1* | 12/2015 | Al-Harthi | C08K 9/02 |
| | | | | 524/562 |
| 2016/0046773 | A1* | 2/2016 | Chen | C08K 3/042 |
| | | | | 524/424 |
| 2016/0153025 | A1* | 6/2016 | Wu | C12Q 1/54 |
| | | | | 435/190 |
| 2016/0299270 | A1* | 10/2016 | Kotov | G02B 5/1828 |
| 2016/0354729 | A1* | 12/2016 | Krishna | B01D 69/148 |
| 2017/0103826 | A1* | 4/2017 | Al-Harthi | H01B 1/04 |
| 2017/0206997 | A1* | 7/2017 | Al-Harthi | H01B 1/04 |
| 2017/0218181 | A1* | 8/2017 | Al-Harthi | C08J 3/28 |
| 2018/0171160 | A1* | 6/2018 | Sarto | C09D 5/24 |

FOREIGN PATENT DOCUMENTS

| | | |
|---|---|---|
| CN | 104841291 A | 8/2015 |
| CN | 104874301 A | 9/2015 |
| CN | 105214502 A | 1/2016 |
| EP | 1506807 A2 | 2/2005 |
| KR | 19910000656 B1 | 1/1991 |
| WO | 2014/051377 A1 | 4/2014 |
| WO | 2014/168629 A1 | 10/2014 |
| WO | 2015/075453 A1 | 5/2015 |
| WO | 2017/044845 A1 | 3/2017 |

OTHER PUBLICATIONS

International Search Report, dated Dec. 13, 2016, PCT/US2016/051101.

Caria, P. F. et al., Ca test of Al2O3 gas diffusion barriers grown by atomic deposition on polymers, Applied Physics Letters 89, 031915-1 to 031915-3 (2006).

International Search Report and Written Opinion, PCT/US2019/020918, dated May 24, 2019.

* cited by examiner

SELECTIVELY PERMEABLE GRAPHENE OXIDE ELEMENT

CROSS REFERENCE TO RELATED APPLICATION

This application is a continuation-in-part of an international Pat. App. PCT/US2016/051101, filed Sep. 9, 2016, which claims the benefit of U.S. Prov. Pat. App. Nos. 62/216,938, filed Sep. 10, 2015, and 62/292,136, filed Feb. 5, 2016.

FIELD

The present embodiments are related to polymeric membranes, and provide a membrane including graphene materials for removing water or water vapor from air or other gas streams.

BACKGROUND

The presence of high moisture level in the air may contribute to serious health issues by promoting growth of mold, fungus, as well as dust mites. In manufacturing and storage facilities, high humidity environment may accelerate product degradation, powder agglomeration, seed germination, corrosion, and other undesired effects in chemical, pharmaceutical, food and electronic industries. A conventional method to dehydrate air is passing wet air through hydroscopic agents, such as glycol, silica gel, molecular sieves, calcium chloride, and phosphorus pentoxide. This method has its disadvantage as it requires a replacement or regeneration of drying agents periodically which makes the dehydration process costly and time consuming. Another way of dehydration of air is a cryogenic method involving compressing and cooling the wet air to condense moisture which is then removed. However, this method is highly energy consuming.

SUMMARY

The present embodiments, including PVA membranes crosslinked by graphene oxide (GO), may reduce water swelling, and improve $H_2O/O_2$ selectivity over neat PVA membranes. Some embodiments may provide an improved dehydration membrane than traditional PVA membranes. The present embodiments include a selectively permeable element that is useful in applications where non-polar gas permeability may be desired to be minimized, while concurrently enabling polar fluid or water vapor to pass through.

Some embodiments include a selectively permeable membrane, such as a dehydration membrane, comprising: a support; a composite comprising a graphene compound, such as a graphene oxide compound, and a polymer, such as a polyvinyl alcohol; wherein the composite is coated on the support. In some embodiments, the membrane has a high moisture permeability and low gas permeability.

Some embodiments include a method of separating a particular gas from a mixture of gases, or dehydrating a gas, comprising applying a pressure gradient across the selectively permeable membrane, such as a dehydration membrane, to cause the particular gas, such as water vapor, to selectively pass through the dehydration membrane, wherein a first gas applies a higher pressure to a first side of the membrane than a pressure applied by a second gas on the other side of the membrane, so that the particular gas, such as water vapor, passes through the dehydration membrane from the first gas into the second gas.

Some embodiments include a device for separating a particular gas, such as water vapor, from a mixture of gases, comprising the selectively permeable membrane, such as a dehydration membrane, wherein the selectively permeable membrane, such as a dehydration membrane, further comprises a first side of the membrane disposed opposite to a second side of the membrane; and a chamber configured to contain the gas to have the particular gas to be removed, such as water vapor, wherein the chamber is in fluid communication with a first side of the dehydration membrane; wherein the device is configured so that, when the device is in use, the first side of the selectively permeable membrane is under a higher pressure than the second side of the selectively permeable membrane.

Some embodiments include a method of making a selectively permeable membrane, such as a moisture-permeable membrane, the method comprising mixing a polymer such as polyvinyl alcohol and a graphene compound, such as a graphene oxide compound, in an aqueous mixture.

DETAILED DESCRIPTION

The present disclosure relates to gas separation membranes where a high moisture permeability membrane with low oxygen and/or nitrogen gas permeability may be useful to dehydrate a gas such as air, oxygen, nitrogen, hydrogen, methane, propylene, carbon dioxide, natural gas, etc. In some embodiments, a moisture permeable GO-PVA membrane may have a high $H_2O/O_2$ selectivity. This may be accomplished by using membranes that are selectively permeable to water vapour, and less permeable to one or more other gases, such as non-polar gas like $O_2$ or $N_2$. Thus, the selectively permeable device may provide a durable dehydration system that may effectively dehydrate air or other desired gases or feed fluids. These dehydration membranes may have improved energy and separation efficiency.

A moisture permeable and/or gas impermeable barrier element may contain a composite, such as a composite comprising a graphene material dispersed in a polymer. This composite may be coated on a support material.

Figure 1:
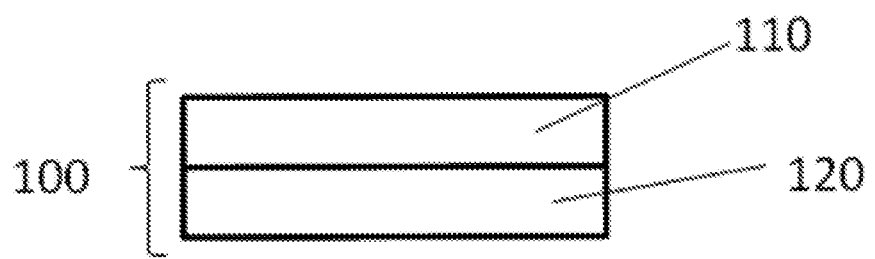
FIG. 1 is a depiction of a possible embodiment of a nanocomposite barrier device that may be used in separation or dehydration applications.

For example, as shown in FIG. 1, a selectively permeable membrane 100 (such as a dehydration membrane), may comprising: a support 120 and a composite 110. Composite 110 may be coated onto support 120.

A composite, such as composite 110, comprises a graphene compound and a polymer.

A graphene material may contain a graphene which has been chemically modified or functionalized. A modified graphene may be any graphene material that has been chemically modified, such as oxidized graphene or functionalized graphene. Oxidized graphene includes graphene oxide or reduced graphene oxide.

Functionalized graphene includes one or more functional groups not present in graphene oxide, such as functional groups that are not OH, COOH or epoxide group directly attached to a C-atom of the graphene base. Examples of functional groups that may be present in functionalized graphene include halogen, alkene, alkyne, CN, ester, amide, or amine.

In some embodiments, more than about 99%, about 95%, about 90%, about 80%, about 70%, about 60%, about 50%, about 40%, about 30%, about 20%, about 10%, or about 5% of the graphene molecules may be oxidized or functionalized.

In some embodiments, the graphene material is graphene oxide, which may provide selective permeability for gases, fluids, and/or vapors. In some embodiments, the selectively permeable element may comprise multiple layers, wherein at least one layer contains graphene material.

It is believed that there may be a large number (~30%) of epoxy groups on GO, which may be readily reactive with hydroxyl groups at elevated temperatures. It is also believed that a GO sheet has an extraordinary high aspect ratio. This high aspect ratio may increase the available gas diffusion surface if dispersed in a polymeric membrane, e.g., PVA membrane. Therefore, PVA crosslinked with GO may not only reduce the water swelling of the membrane, but also increase the membrane gas separation efficiency. It is also believed that the epoxy or hydroxyl groups increases the hydrophilicity of the materials, and thus contributes to the increase in water vapor permeability and selectivity of the membrane.

In some embodiments, the graphene material may be in the form of sheets, planes or flakes. In some embodiments, the graphene material may be in the shape of platelets. In some embodiments, the graphene may have a platelet size of about 0.05-100 μm, about 0.1-50 μm, about 0.5-10 μm, about 1-5 μm, about 0.1-2 μm, about 1-3 μm, about 2-4 μm, about 3-5 μm, about 4-6 μm, about 5-7 μm, about 6-8 μm, about 7-10 μm, about 10-15 μm, about 15-20 μm, about 50-100 μm, about 60-80 μm, about 50-60 μm, about 25-50 μm, or any platelet size in a range bounded by any of these values.

In some embodiments, the graphene may have a surface area of about 0.1-20,000 $μm^2$, about 2-50 $μm^2$, about 0.1-5 $μm^2$, about 2-10 $μm^2$, about 5-20 $μm^2$, about 10-30 $μm^2$, about 20-40 $μm^2$, about 30-50 $μm^2$, or about 40-60 $μm^2$ per platelet, or any surface area in a range bounded by any of these values.

In some embodiments, the graphene material may have a surface area of about 100 $m^2/g$ to about 5000 $m^2/g$, about 150 $m^2/g$ to about 4000 $m^2/g$, about 200 $m^2/g$ to about 1000 $m^2/g$, about 400 $m^2/g$ to about 500 $m^2/g$, or about any surface area of graphene material in a range bounded by, or between, any of these values.

A moisture permeable and/or gas impermeable barrier element may contain graphene material dispersed in a polymer. For example, the graphene material, such as a graphene oxide, may be dispersed in a polymer, such as polyvinyl alcohol, in the form of a composite. The graphene material, e.g. a graphene oxide, and the polymer, e.g. polyvinyl alcohol, may be covalently bonded or crosslinked to one another.

When the polymer is polyvinyl alcohol, the molecular weight may be about 100-1,000,000 Da, about 10,000-500,000 Da, about 10,000-50,000 Da, about 50,000-100,000 Da, about 70,000-120,000 Da, about 80,000-130,000 Da, about 90,000-140,000 Da, about 90,000-100,000 Da, about 95,000-100,000 Da, about 98,000 Da, or any molecular weight in a range bounded by any of these values.

In some embodiments, the graphene material may be arranged in the polymer material in such a manner as to create an exfoliated nanocomposite, an intercalated nanocomposite, or a phase-separated micro-composite. A phase-separated micro-composite may be generated when, although mixed in the polymer, the graphene material exists as a separate and distinct phase apart from the polymer. An intercalated nanocomposite may be produced when the polymer compounds begin to intermingle among or between the graphene platelets but the graphene material may not be distributed throughout the polymer. In an exfoliated nanocomposite phase the individual graphene platelets may be distributed within or throughout the polymer. An exfoliated nanocomposite phase may be achieved by chemically exfoliating the graphene material by a modified Hummer's method. In some embodiments, the majority of the graphene material may be staggered to create an exfoliated nanocomposite as a dominant material phase. In some embodiments, the graphene material may be separated by about 10 nm, about 50 nm, about 100 nm to about 500 nm, or about 100 nm to about 1 micron.

The graphene (e.g. graphene oxide)/polymer (e.g. PVA) composite may be in the form of a film, such as a thin film having a thickness of about 0.1-1000 μm, about 0.1-20 μm, about 0.1-0.5 μm, about 0.5-2 μm, about 1-3 μm, about 3-5 μm, about 4-6 μm, about 6-8 μm, about 8-10 μm, about 10-12 μm, about 12-15 μm, about 15-20 μm, about 20-30 μm, about 30-50 μm, about 1.4 μm, about 5 μm, about 10 μm, or any thickness in a range bounded by any of these values.

In some embodiments, the weight percentage of the graphene oxide relative to the PVA is about 0.0001-75%, about 0.001-20%, about 0.1%-1%, about 1%, about 0.1-0.5%, about 0.5-1.5%, about 0.5-1%, about 0.9-1%, about 1-1.1%, about 1-1.2%, about 1-1.5%, about 1-2%, about 1.5-2.5%, about 2-3%, about 3-4%, about 3-3.5%, about 4-5%, or about 0.5-4% w/w, about 0.1-10%, about 10-20%, about 20-40%, or any percentage in a range bounded by any of these values.

Graphene oxide may be crosslinked to a PVA, e.g. by one or more ester or ether bonds. In some embodiments, at least about 1%, about 5%, about 10%, about, 20%, about 30%, about 40%, about 50%, about 60%, about 70%, about 80%, about 90%, about 95% or 100% of the graphene oxide molecules are crosslinked.

In some embodiments, e.g., when the polymer material is polyvinyl alcohol, the graphene material and the polymer material may be crosslinked by applying heating between about 50° C. to about 125° C., for a period of about 5 minutes to about 4 hours, e.g., at 90° C. for about 30 minutes. In some embodiments, the graphene material and the polymer material may be crosslinked without an additional crosslinker material by sufficient exposure to an ultraviolet radiation.

A membrane described herein may be selectively permeable. For example, the membrane may be relatively permeable for one material and relatively impermeable for another material. For example, a membrane may be relatively permeable to water vapor and relatively impermeable to oxygen and/or nitrogen gas. The ratio of permeability of the different materials may be used to quantify the selective permeability.

In some embodiments, the membrane may be a dehydration membrane. For example, the membrane may dehydrate a gas such as air, oxygen, nitrogen, hydrogen, methane, propylene, carbon dioxide, natural gas, etc. Some membranes may separate other gases from one another.

In some embodiments, the membrane may have low gas permeability, such as less than 0.100 $cc/m^2 \cdot day$, 0.010 $cc/m^2 \cdot day$, and/or 0.005 $cc/m^2 \cdot day$. A suitable method for determining gas permeability is disclosed in US 2014/0272, 350, ASTM D3985, ASTM F1307, ASTM 1249, ASTM F2622, and/or ASTM F1927, which are incorporated by reference for their disclosure of determining gas (oxygen) permeability %, e.g., oxygen transfer rate (OTR).

In some embodiments, the membrane has relatively high water vapor permeability, such as greater than 10.0 g/m²·day, greater than 5.0 g/m²·day, greater than 3.0 g/m²·day, greater than 2.5 g/m²·day, greater than 2.25 g/m²·day, or greater than 2.0 g/m²·day. In some embodiments, the moisture permeability may be a measure of water vapor permeability/transfer rate at the above described levels. Suitable methods for determining moisture (water vapor) permeability are disclosed in Caria, P. F., Ca test of $Al_2O_3$ gas diffusion barriers grown by atomic deposition on polymers, Applied Physics Letters 89, 031915-1 to 031915-3 (2006), ASTM D7709, ASTM F1249, ASTM398 and/or ASTME96, which are incorporated by reference in their entireties for disclosure of determining moisture permeability %, e.g., water vapor transfer rate (WVTR).

In some embodiments, the selective permeability may be reflected in a ratio of permeability of water vapor versus at least one selected gas, e.g., oxygen and/or nitrogen. In some embodiments, the membrane may exhibit a permeability ratio of water vapor versus gas, e.g, WVTR/OTR, to be greater than 50, greater than 100, greater than 200, or greater than 400. In some embodiments, the selective permeability may be a measure of ratio of permeability/transfer rate of water vapor versus gas as above described.

In some embodiments, the support may comprise a porous material, such as a polymer material, including a polyamide, polyvinylidene fluoride, polyethylene terephthalate, polysulfone, polyether sulfone, polypropylene, polyethylene and/or mixtures thereof. In some embodiments, the porous support can comprise a polyamide (e.g. Nylon). In some embodiments, the porous material may be a polysulfone based ultrafiltration membrane. In some embodiments, the porous material can be polyvinylidene fluoride. In some embodiments, the porous material can be polypropylene. In some embodiments, the porous material can be polyethylene. In some embodiments, the porous material can be a mixture of polypropylene and polyethylene. In some embodiments, the porous material may comprise hollow fibers. The hollow fibers may be cast or extruded. The hollow fibers may be made as described in U.S. Pat. Nos. 4,900,626; 6,805,730 and U. S. Patent Publication No. 2015/0165389, which are incorporated by reference in their entireties.

In some embodiments, the selectively permeable element may be disposed between a fluidly communicated first fluid reservoir and a second fluid reservoir. In some embodiments, the first reservoir may contain a feed fluid upstream and/or at the selectively permeable element. In some embodiments, the second reservoir may contain a processed fluid downstream and/or at the selectively permeable element. In some embodiments, the selectively permeable element selectively allows undesired water vapour pass therethrough while retaining or reducing the passage of another gas or fluid material from passing therethrough. In some embodiments, the selectively permeable element may provide a filter element to selectively remove water vapour from a feed fluid while enabling the retention of processed fluid with substantially less undesired water or water vapor. In some embodiments, the selectively permeable element has a desired flow rate. In some embodiments, the selectively permeable element may comprise an ultrafiltration material. In some embodiments, the selectively permeable element exhibits a flow rate of about 0.001-0.1 liter/min; about 0.005-0.075 liter/min; or about 0.01-0.05 liter/min, for example at least about 0.005 liter/min., at least about 0.01 liter/minute, at least about 0.02 liter/min, at least about 0.05 liter/min, about 0.1 liter/min, about 0.5 liter/min, about 1.0 liter/min. or any flow rate of the selectively permeable element in a range bounded by, or between, any of these values. In some embodiments, the selectively permeable element may comprise an ultrafiltration material. In some embodiments, the selectively permeable element comprises a filter having a molecular weight of at least 70%, at least 75%, at least 80%, at least 85%, at least 90%, at least 95%, at least 97% at least 99% of 5000-200,000 Daltons. In some embodiments, the ultrafiltration material or a membrane containing such material may have an average pore size or fluid passageway of about 0.01 μm (10 nm) to about 0.1 μm (100 nm), or about 0.01 μm (10 nm) to about 0.05 μm (50 nm) in average diameter. In some embodiments, the membrane surface area is about 0.01 m², 0.05 m², 0.10 m², 0.25 m², 0.35 m², to about 0.50 m², 0.60 m², 0.70 m², 0.75 m², 1.00 m², 1.50 m² to about 2.50 m², about at least 5 m², 10 m², 15 m², 20 m², 25 m², 30 m², 40 m², 50 m²; 60 m², about 65-100 m², about 500 m², or any membrane surface area in a range bounded by, or between, any of these values.

In some embodiments, the selectively permeable element may comprise a dispersant. In some embodiments, the dispersant may be ammonium salts, e.g., $NH_4Cl$; Flowlen; fish oil; long chain polymers; steric acid; oxidized Menhaden Fish Oil (MFO); dicarboxylic acids such as succinic acid, ethanedioic acid, propanedioic acid, pentanedioic acid, hexanedioic acid, heptanedioic acid, octanedioic acid, nonanedioic acid, demayedioic acid, o-phthalic acid, and p-phthalic acid; sorbitan monooleate; and mixtures thereof. Some embodiments preferably use oxidized MFO as a dispersant.

In some embodiments, the composite of the selectively permeable element may further comprise an alkali metal halide. In some embodiments, the alkali metal can be lithium. In some embodiments, the halide can be chloride. In some embodiments, the alkali metal halide salt can be LiCl. In some embodiments the alkali halide, such as LiCl, can be present in the selectively permeable element in an amount of about 1-50%, about 5-40%, about 10-30%, about 20.0-30.0%, about 25-30%, about 30-40%, about 10-20%, about 5-10%, about 22%, about 23%, about 24%, about 25%, or about 30% by weight, based upon the weight of the composite, or any percentage in a range bounded by any of these values.

Some graphene/polymer composites may comprise polyethylene glycol, such as polyethylene glycol having a molecular weight of about 100-50,000 Da, about 1,000-10,000 Da, about 2,000-12,000 Da, about 4,000-8,000 Da, about 5,000-10,000 Da, about 6,000 Da, or any molecular weight in a range bounded by any of these values. The polyethylene glycol may be about 0.2-10%, about 0.5-5%, about 1-2%, about 1.5-2.5%, about 1.5-2%, or about 1.8% of the weight of the composite, or any amount in a range bounded by any of these values.

In some embodiments, the selectively permeable element may comprise plasticizers. In some embodiments, the plasticizers may be Type 1 Plasticizers which may generally decrease the glass transition temperature ($T_g$), making it more flexible, e.g. phthalates (n-butyl, dibutyl, dioctyl, butyl benzyl, esters, or dimethyl), and/or Type 2 Plasticizers, which may enable the formation of more flexible, more deformable layers, and perhaps reduce the amount of voids resulting from lamination, e.g., glycols (polyethylene; polyalkylene; polypropylene; triethylene; dipropylglycol or benzoate). Type 1 Plasticizers may include butyl benzyl phthalate; dicarboxylic/tricarboxylic ester-based phthalate plasticizers, such as bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate and mixtures thereof; adipate-based plasticizers such as bis(2-ethylhexyl)adipate, dimethyl adipate, monomethyl adipate, dioctyl adipate and mixtures thereof; sebacate-based plasticizers such as but not limited to dibutyl sebacate, and maleate. Type 2 Plasticizers may include dibutyl maleate, diisobutyl maleate and mixtures thereof, polyalkylene glycols such as polyethylene glycol, polypropylene glycol and mixtures thereof. Other plasticizers which may include benzoates, epoxidized vegetable oils, sulfonamides such as N-ethyl toluene sulfonamide; N-(2-hydroxypropyl) benzene sulfonamide; N-(n-butyl)benzene sulfonamide, organophosphates such as tricresyl phosphate; tributyl phosphate, glycols/polyethers such as triethylene glycol dihexanoate; tetraethylene glycol diheptanoate and mixtures thereof, alkyl citrates such as triethyl citrate; acetyl triethyl citrate; tributyl citrate; acetyl tributyl citrate; trioctyl citrate; acetyl trioctyl citrate; trihexyl citrate; acetyl trihexyl citrate; butyryl trihexyl citrate; or trimethyl citrate, alkyl sulphonic acid phenyl ester and mixtures thereof.

In some embodiments, solvents may also be present in the selectively permeable element. Used in manufacture of material layers, solvents include water, a lower alkanol such as ethanol; methanol; and isopropyl alcohol, xylenes, cyclohexanone, acetone, toluene and methyl ethyl ketone, and mixtures thereof. Some embodiments preferably use a mixture of xylenes and ethanol for solvents.

In some embodiments, the selectively permeable element may be disposed between a substrate and a protective coating to create a selectively permeable device. In some embodiments, the substrate and/or the protective coating may be porous. In some embodiments, the substrate and/or the protective coating may be permeable. In some embodiments, the substrate and/or the protective coating may comprise a polymer. In some embodiments the polymer may comprise vinyl polymers such as polyvinyl butyral (PVB), polyvinyl alcohol (PVA), polyvinyl chloride (PVC), polyvinyl acetate (PVAc), polyacrylonitrile, a mixture thereof, and/or copolymers thereof, polyethyleneimine; polymethylmethacrylate (PMMA); vinyl chloride-acetate; and mixtures thereof.

A moisture permeable and/or gas barrier element may be prepared by a method comprising: (1) mixing a polymer and a graphene in an aqueous mixture; (2) blade coating the mixture on a substrate to create a thin film, for example, a film having a thickness between about 5 µm to about 30 µm; (3) and drying the mixture, for example by heating the mixture for about 15 minutes to about 72 hours at a temperature ranging from 20° C. to about 120° C.

In some embodiments, the resulting coating may be annealed for about 10 hours to about 72 hours at a temperature ranging from about 40° C. to about 200° C. In some embodiments, the method can comprise mixing a polymer solution, a graphene solution, a crosslinker solution, and an alkali halide to create an aqueous mixture. In some embodiments, the method further comprises adding sufficient acid to effect a process of hydrolysis and condensation. In some embodiments, the method further comprises irradiating the barrier element with UV-radiation for 15 minutes to 15 hours at a surface with intensity of about 0.001 W/cm² to about 100 W/cm². In some embodiments, the method further comprises coating the resulting barrier element with a protecting coating to yield a barrier device.

In some embodiments, a method for creating the aforementioned selectively permeable element is provided. In some embodiments, graphene is mixed with a polymer solution to form an aqueous mixture. In some embodiments, the polymer is in an aqueous solution. In some embodiments, a graphene dispersion is mixed with the polymer solution, and the mixing ratio of the graphene dispersion to the polymer solution may be about 0.1:100, about 1:10, about 1:4, about 1:2, about 1:1, about 2:1, about 4:1, about 9:1 and about 10:1. Some embodiments preferably use a mixing ratio of about 1:1. In some embodiments, the graphene and polymer are mixed such that the dominant phase of the mixture comprises exfoliated nanocomposites. In the exfoliated-nanocomposite phase, the graphene platelets are aligned in such way that permeability is reduced in the finished film by elongating the possible molecular pathways through the film. In some embodiments, the graphene composition may comprise any combination of the following: graphene, graphene oxide, and/or functionalized graphene oxide. In some embodiments, the graphene composition is suspended in an aqueous solution of about 0.001% wt and about 0.08% wt. Some embodiments preferably use a graphene concentration of about 0.01% wt of the solution. In some embodiments the polymer may be in about a 5% to about 15% aqueous solution. Some embodiments preferably use about a 10% aqueous solution.

In some embodiments, graphene can be mixed with a polymer solution and an alkali halide to form an aqueous mixture. In some embodiments, the alkali metal halide salt can be LiCl. In some embodiments the alkali halide can be added in the form of an aqueous solution of about 1-50% wt, 20-30%, 15-25%, about 1-10%, about 1-5%, about 1-3%, about 1-2%, about 1.5% wt, or any percentage in a range bounded by any of these values.

In some embodiments, an acid may be added to a mixture of a graphene, such as a graphene oxide, and a polymer, such as polyvinyl alcohol, to catalyze a crosslinking reaction, such as an acid catalyzed dehydration.

In some embodiments, the mixture comprising a graphene material and a polymer may be blade coated on a permeable or non-permeable substrate to create a thin film with thickness of about 5 µm to about 30 µm, about 10-20 µm, about 20-30 µm, about 25-30 µm, about 5-10 µm, e.g. about 30 µm, to form a partial element. In some embodiments, the mixture may be disposed upon the substrate—which may be permeable, non-permeable, porous, or non-porous—by spray coating, dip coating, spin coating and/or other methods for deposition of the mixture on a substrate. In some embodiments, the casting may be done by co-extrusion, film deposition, blade coating, or any other method for deposition of a film on a substrate known in the art. In some embodiments, the mixture is casted onto a substrate by blade coating (or tape casting) using a doctor blade and dried to form a partial element. The thickness of the resulting cast tape may be adjusted by changing the gap between the doctor blade and the moving substrate. In some embodiments, the gap between the doctor blade and the moving substrate is in the range of about 0.002 mm to about 1.0 mm. In some embodiments, the gap between the doctor blade and the moving substrate is preferably about 0.20 mm to about 0.50 mm. Meanwhile, the speed of the moving substrate may have a rate in the range of about 30 cm/min. to about 600 cm/min. By adjusting the substrate moving speed and the gap between the blade and moving substrate, the thickness of the resulting graphene polymer layer may be expected to be about 5 µm to about 30 µm, about 10-20 µm, about 20-30 µm, or about 5-15 µm. In some embodiments, the thickness of the layer may be about 10 µm such that transparency is maintained resulting in a selectively permeable element.

In some embodiments, after deposition of the graphene layer on the substrate, the selectively permeable element may then be dried to remove the underlying solvents from the graphene layer. In some embodiments, the drying temperature may be around room temperature, or about 20° C. to about 120° C. In some embodiments the drying time may range from about 15 minutes to about 72 hours depending on the temperature. The purpose is to remove water and precipitate the cast form. Some embodiments prefer that drying is accomplished at about 90° C. for about 30 minutes.

In some embodiments, the dried selectively permeable element may be isothermally crystallized, and/or annealed. In some embodiments, annealing may be done from about 10 hours to about 72 hours at an annealing temperature of about 40° C. to about 200° C. Some embodiments prefer that annealing is accomplished at about 100° C. for about 16 hours or about 18 hours.

After annealing, the selectively permeable element may be then optionally laminated with a protective coating layer, such that the graphene layer is sandwiched between the substrate and the protective layer. In some embodiments, additional layers may be added to enhance the properties of the selectively permeable element by co-extrusion, film deposition, blade coating or any other method known in the art. In some embodiments, the protective layer is secured to the graphene with an adhesive layer to the selectively permeable element to yield the selectively permeable device. In some embodiments, the selectively permeable element is directly bonded to the substrate to yield the selectively permeable device.

The embodiments described herein may provide as part of a module into which water vapor (saturated or near saturated) and compressed air are introduced. The module produces a dry pressurized product stream (typically having an oxygen concentration within about 1-21%) and a low pressure permeated stream. The permeated stream contains a mixture of air and the bulk of the water vapor introduced into the module.

A secondary dry sweep stream may be used to optimize the dehydration process. If the membrane were totally efficient in water separation, all the water or water vapor in the feed stream would be removed, and there would be nothing left to sweep it out of the system. As the process proceeds, the partial pressure of the water on the feed or bore side becomes lower, and the pressure on the shell-side becomes higher. This pressure difference tends to prevent additional water from being expelled from the module. Since the object is to make the bore side dry, the pressure difference interferes with the desired operation of the device. A sweep stream may therefore be used to remove the water or water vapor from the feed or bore side, in part by absorbing some of the water, and in part by physically pushing the water out.

If a sweep stream is used, it may come from an external dry source or a partial recycle of the product stream of the module. In general, the degree of dehumidification will depend on the pressure ratio of product flow to feed flow (for water vapor across the membrane) and on the product recovery. Good membranes have a high product recovery with low level of product humidity, and/or high volumetric product flow rates.

The membranes of the present invention are easily made at low cost, and may outperform existing commercial membranes in either volumetric product flow or product recovery.

A membrane for separation of gases, such as dehydrating membrane, may be incorporated into a device that provides a pressure gradient across the dehydrating membrane so that the gas to be dehydrated (or separated) has a higher pressure than that of the water vapor (or the gas being removed) on the opposite side of the dehydrating membrane where the water (or other gas to be removed) is received. For example, the device may comprise a chamber configured to contain the gas to be dehydrated, and in fluid communication with a first side of the dehydration membrane. The device may be configured so that, when the device is in use, the pressure of the gas to be dehydrated in the chamber has a higher pressure on the first side of the membrane than the pressure of any gas present on the second side of the membrane into which the water vapor (or another gas) is removed. The device may optionally further comprise a second chamber configured to receive water vapor (or other gas to be removed), and in fluid communication with a second side (opposite side to the first side) of the dehydration membrane.

Figure 2:
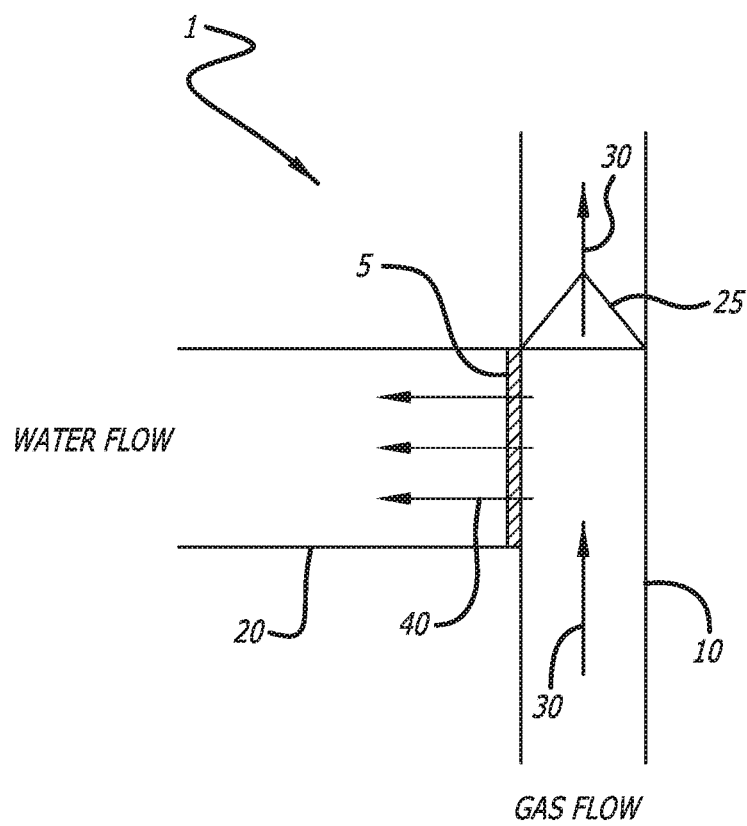
FIG. 2 is a depiction of an embodiment of a device containing a selectively permeable membrane.

An example of a device having a dehydrating membrane is depicted in FIG. 2. Dehydrating device 1 comprises a chamber 10 containing a gas to be dehydrated. Dehydrating membrane 5 is disposed in fluid communication with the chamber 10 and optionally a second chamber 20. Device 10 may optionally comprise a valve 25, such as a one way or a pressure valve, which causes the pressure of the gas to be dehydrated in the chamber 10 to have a higher pressure than that of any gas on the outside of chamber 10 if there is no second chamber (or the pressure of the contents in second chamber 20 if second chamber is present). For example, the gas to be dehydrated may flow in direction 30, indicated by arrows, through valve 25. The pressure caused by the flow, valve 25, and/or optionally additional pressure applied or added can selectively drive water vapor through the membrane 5 in direction 40, indicated by arrows.

The membrane of the present invention may apply to a fiber using the techniques described in U.S. Pat. Nos. 4,772,392; 4,900,626, and/or 6,805,730, the disclosures of which are incorporated by reference for their disclosure related to methods of applying a membrane to a fiber.

EMBODIMENTS

The following specific embodiments are specifically contemplated:

Embodiment 1

A dehydration membrane comprising:

a support;

a composite comprising a graphene oxide compound and a polyvinyl alcohol;

wherein the composite is coated on the support; and wherein the membrane has a high moisture permeability and low gas permeability.

Embodiment 2

The membrane of embodiment 1, wherein the gas is non-polar.

Embodiment 3

The membrane of embodiment 1 or 2, wherein the gas is inert.

Embodiment 4

The membrane of embodiment 1, 2, or 3, wherein the support is porous.

Embodiment 5

The membrane of embodiment 1, 2, 3, or 4, wherein the support comprises polyamide, polyvinylidene fluoride, polyethylene terephthalate, polysulfone, polyether sulfone, polypropylene, or polyethylene, or a mixture thereof.

Embodiment 6

The membrane of embodiment 1, 2, 3, 4, or 5, wherein the graphene oxide compound and polyvinyl alcohol are cross-linked.

Embodiment 7

The membrane of embodiment 1, 2, 3, 4, 5, or 6, wherein the graphene oxide compound is present at about 0.1% to about 10% by weight as compared to the weight of the polyvinyl alcohol.

Embodiment 8

The membrane of embodiment 1, 2, 3, 4, 5, 6, or 7, wherein the graphene oxide compound is graphene oxide, reduced-graphene oxide, functionalized graphene oxide, or functionalized and reduced-graphene oxide.

Embodiment 9

The membrane of embodiment 8, wherein the graphene oxide compound is graphene oxide.

Embodiment 10

The membrane of embodiment 1, 2, 3, 4, 5, 6, 7, or 8, wherein graphene oxide compound has a platelet-like particle having a size from about 0.05 μm to about 10 μm.

Embodiment 11

The membrane of embodiment 1, 2, 3, 4, 5, 6, 7, 8, 9, or 10, wherein the membrane comprises hollow fibers.

Embodiment 12

The membrane of embodiment 1, 2, 3, 4, 5, 6, 7, 8, 9, or 10, wherein the composite further comprises lithium chloride.

Embodiment 13

The membrane of embodiment 1, 2, 3, 4, 5, 6, 7, 8, 9, 10, or 11, wherein the composite further comprises polyethylene glycol.

Embodiment 14

The membrane of embodiment 1, 2, 3, 4, 5, 6, 7, 8, 9, 10, 11, 12, or 13, wherein the composite is in the form of a film having a thickness of about 1 μm to about 50 μm.

Embodiment 15

A method of dehydrating a gas, comprising applying a pressure gradient across the dehydration membrane of embodiment 1, 2, 3, 4, 5, 6, 7, 8, 9, 10, 11, 12, 13, or 14 to cause water vapor to selectively pass through the dehydration membrane, wherein a first gas applies a higher pressure to a first side of the membrane than a pressure applied by a second gas to a second side of the membrane, so that water vapor passes through the dehydration membrane from the first gas into the second gas.

Embodiment 16

The method of embodiment 15, wherein the first gas comprises water vapor and one or more other gases.

Embodiment 17

The method of embodiment 16, wherein the other gas is non-polar.

Embodiment 18

The method of embodiment 16, wherein the other gas is inert.

Embodiment 19

The method of embodiment 16, wherein the other gas comprises air, oxygen or nitrogen.

Embodiment 20

A device for dehydrating a gas comprising a dehydration membrane of embodiment 1, 2, 3, 4, 5, 6, 7, 8, 9, 10, 11, 12, 13, or 14, wherein the dehydration membrane further comprises a first side of the dehydration membrane disposed opposite to a second side of the dehydration membrane; and a chamber configured to contain the gas to be dehydrated which is in fluid communication with the first side of the dehydration membrane; wherein the device is configured so that, when the device is in use, the first side of the dehydration membrane is under a higher pressure than the second side of the dehydration membrane.

Embodiment 21

The device of embodiment 20, wherein the gas to be dehydrated is non-polar.

Embodiment 22

The device of embodiment 20, wherein the gas to be dehydrated is inert.

Embodiment 23

The device of embodiment 20, wherein the gas to be dehydrated is air, oxygen or nitrogen.

Embodiment 24

A method of making a moisture-permeable membrane, the method comprising mixing a polyvinyl alcohol and a graphene oxide compound in an aqueous mixture.

Embodiment 25

The method of embodiment 24, further comprising coating the membrane with a protecting coating.

Embodiment 26

The method of embodiment 24 or 25, further comprising:
blade coating the aqueous mixture on a substrate to create a thin film and drying the aqueous mixture.

Embodiment 27

The method of embodiment 26, wherein the thin film has a thickness of between about 1 µm to about 50 µm.

Embodiment 28

The method of embodiment 26, wherein the thin film has a thickness of between about 5 µm to about 30 µm.

Embodiment 29

The method of embodiment 26, 27, or 28, wherein the aqueous mixture is dried for about 5 minutes to about 96 hours.

Embodiment 30

The method of embodiment 29, wherein the aqueous mixture is dried for about 15 minutes to about 72 hours.

Embodiment 31

The method of embodiment 26, 27, 28, 29, or 30, wherein the aqueous mixture is dried at a temperature in a range of about 10° C. to about 20° C.

Embodiment 32

The method of embodiment 31, wherein the aqueous mixture is dried at a temperature in a range about 20° C. to about 120° C.

Embodiment 33

The method of embodiment 26, 27, 28, 29, 30, 31, or 32, wherein the dried mixture is annealed for about 5 hours to about 96 hours.

Embodiment 34

The method of embodiment 33, wherein the dried mixture is annealed for about 10 hours to about 72 hours.

Embodiment 35

The method of embodiment 26, 27, 28, 29, 30, 31, 32, 33, or 34, wherein the dried mixture is annealed at a temperature in a range of about 20° C. to about 300° C.

Embodiment 36

The method of embodiment 35, wherein the dried mixture is annealed at a temperature in a range of about 40° C. to about 200° C.

EXAMPLES

It has been discovered that embodiments of the selectively permeable elements described herein have improved permeability for polar molecules with resistance to non-polar gases such as oxygen gas with acceptable material properties as compared to other selectively permeable elements. These benefits are further shown by the following examples, which are intended to be illustrative of the embodiments of the disclosure, but are not intended to limit the scope or underlying principles in any way.

Preparation of Graphene Oxide: GO Dispersion:

GO was prepared from graphite using modified Hummers method. Graphite flake (2.0 g, 100 mesh, Aldrich, St. Louis, Mo. USA) was oxidized in a mixture of $NaNO_3$ (2.0 g), $KMnO_4$ (10 g) and concentrated $H_2SO_4$ (98%, 96 mL) at 50° C. for 15 hours. The resulting pasty mixture was then poured into ice (400 g) followed by the addition of 30% hydrogen peroxide (20 mL) in water. The resulting solution was stirred for 2 hours to reduce the manganese dioxide, filtered through filter paper, and washed with deionized (DI) water. The solid was collected and dispersed in DI water with stirring, centrifuged at 6300 rpm for 40 minutes, and the top aqueous layer was removed. The remaining solid was dispersed again in DI water, and the above washing process was repeated 4 times. The purified GO was then dispersed in DI water under sonication (20 W) for 2.5 hours to yield a GO dispersion (0.4% wt). The GO had a platelet size of about 1-5 µm.

Preparation of Selectively Permeable Elements

Example 1: Preparation of GO-PVA/PET Membrane (EX-1)

4 mg/mL of a graphene oxide (GO) aqueous dispersion prepared as described above was diluted to 0.1% by weight using de-ionized water. Then, 10.0 g of the resulting 0.1% graphene oxide aqueous dispersion was added to an aqueous solution of 10.0 g of 10% PVA (Aldrich, molecular weight of 98,000 Da). The mixture was then stirred at room temperature for 16 hours. The resulting solution was tape casted onto a 125 µm thick poly(ethylene terephthalate) (PET) substrate (E Plastics, San Diego, Calif., USA) using a casting knife with a gap of 300 µm. Afterwards, the substrate was placed in an oven at 90° C. for 30 minutes to remove water and crosslink the membrane, resulting in a film that was 10 µm thick with 1% wt/wt of GO/PVA as EX-1.

Example 2: Preparation of GO-PVA/PSF Membranes (EX-2)

4 mg/mL of a graphene oxide (GO) aqueous dispersion prepared as described above was diluted to 0.1% by de-ionized water. Then, 10.0 g of the resulting 0.1% graphene oxide aqueous dispersion was added to an aqueous solution of 10.0 g of 10% PVA (Aldrich). The mixture was diluted with 20 g of water, and stirred at room temperature for 16 hours. The resulting solution was tape casted onto a 40 µm thick polysulfone with nonwoven fabric substrate (Hydranautics, San Diego, Calif., USA) using a casting knife with a gap of 100 µm. After drying in air, the membrane was put in an oven at 85° C. for 30 minutes to remove water and crosslink the membrane, resulting in a membrane that was 5 µm thick with 1% wt/wt GO/PVA as EX-2.

Example 3: Preparation of GO-PVA+LiCl/PSF Membrane (EX-3)

4 mg/mL of a graphene oxide (GO) aqueous dispersion prepared as described above was diluted to 0.1% by de-ionized water. Then, 10.0 g of the resulting 0.1% graphene oxide aqueous dispersion was added to 10% PVA (10.0 g) aqueous solution (Aldrich). To this mixture, 20.0 g of 1.5% lithium chloride aqueous solution was added. The mixture was stirred at room temperature for 16 hours. The resulting solution was tape casted onto a 40 µm thick polysulfone with nonwoven fabric substrate (Hydranautics) using a casting knife with a gap of 100 µm. After drying in air, the membrane was put in an oven at 85° C. for 30 minutes to remove water and crosslink the membrane, resulting in a membrane that was 5 µm thick with GO/LiCl/PVA in a ratio of 1/30/100 by weight, or 0.7% of GO and 23% of LiCl in PVA as EX-3.

Example 4: Preparation of GO-PVA+LiCl/PVDF Membrane (EX-4)

4 mg/mL of a graphene oxide (GO) aqueous dispersion prepared as described above was diluted to 0.1% by de-ionized water. Then, 10.0 g of the resulting 0.1% graphene oxide aqueous dispersion was added to 10.0 g of 10% PVA aqueous solution (Aldrich). To this mixture, 20.0 g of 1.5% lithium chloride aqueous solution was added. The resulting mixture was stirred at room temperature for 10 minutes to get a solution which was then tape casted onto a PVDF substrate (Sterlitech, Kent, Wash. USA) using a casting knife with a gap of 100 µm. After drying in air, the membrane was put in an oven at 85° C. for 30 minutes in order to remove water and crosslink the membrane, resulting in a membrane that was 5 µm thick with GO/LiCl/PVA in a ratio of 1/30/100 by weight as EX-4.

Example 5: Preparation of PVA+LiCl/PVDF Membrane (EX-5)

Into 20.0 g of 5% PVA aqueous solution (Aldrich), 20.0 g of 1.5% lithium chloride aqueous solution was added. The mixture was stirred at room temperature for 10 minutes, and the resulting solution was then tape casted onto a PVDF substrate (Sterlitech) using a casting knife with a gap of 100 µm. After drying in air, the membrane was put in an oven at 85° C. for 30 minutes in order to remove water, resulting in a membrane that was 5 µm thick with LiCl/PVA in 30/100 by weight as EX-5.

Example 6: Preparation of GO-PVA+LiCl/Nylon Membrane (EX-6)

4 mg/mL of a graphene oxide (GO) aqueous dispersion prepared as described above was diluted to 0.1% by de-ionized water. Then, 10.0 g of the resulting 0.1% graphene oxide aqueous dispersion was added to a mixture consisting of 40.0 g of 2.5% PVA aqueous solution (Aldrich). To this mixture, 20.0 g of 1.5% lithium chloride aqueous solution was added. The resulting mixture was stirred at room temperature for 10 minutes. The resulting solution was then tape casted onto a nylon membrane substrate (Pall Corporation, Port Washington, N.Y., USA) using a casting knife with a gap of 200 µm. After drying in air, the membrane was put in an oven at 85° C. for 30 minutes in order to remove water and crosslink the membrane, resulting in a membrane that was 5 µm thick with GO/LiCl/PVA in 1/30/100 by weight as EX-6.

Example 7: Preparation of GO-PVA+PEG/Nylon Membrane (EX-7)

4 mg/mL of a graphene oxide (GO) aqueous dispersion prepared as described above was diluted to 0.1% by de-ionized water. Then, 10.0 g of the resulting 0.1% graphene oxide aqueous dispersion was added to a mixture consisting of 40.0 g of 2.5% PVA aqueous solution (Aldrich). To this mixture, 1.6 g of 1.5% PEG (Polyethylene glycol, 6,000 Da molecular weight) solution (Aldrich) was added. The resulting mixture was stirred at room temperature for 10 minutes. The resulting solution was then tape casted onto a nylon membrane substrate (Pall Corporation) using a casting knife with a gap of 200 µm. After drying in air, the membrane was put in an oven at 85° C. for 30 minutes in order to remove water and crosslink the membrane, resulting in a membrane that was 5 µm thick with GO/PVA/PEG in 1/100/2.4 by weight as EX-7.

Example 8: Preparation of GO-PVA+PEG Membrane (EX-8)

4 mg/mL of a graphene oxide (GO) aqueous dispersion prepared as described above was diluted to 0.1% by de-ionized water. Then, 10.0 g of the resulting 0.1% graphene oxide aqueous dispersion was added to a 40.0 g of 2.5% PVA aqueous solution (Aldrich). To this mixture, 20.0 g of 1.5% lithium chloride aqueous solution followed by a solution of 1.6 g of 1.5% PEG (Polyethylene glycol) (Aldrich) was added. The resulting mixture was stirred at room temperature for 10 minutes. The resulting solution was then tape casted onto a nylon membrane substrate (Pall Corporation) using a casting knife with a gap of 200 µm. After drying in air, the membrane was put in an oven at 85° C. for 30 minutes in order to remove water and crosslink the membrane, resulting in a membrane that was 5 µm thick with GO/PVA/LiCl/PEG in 1/100/30/2.4 by weight as EX-8.

Example 9: Preparation of GO-PVA Mitsubishi Membrane (EX-9)

4 mg/mL of a graphene oxide (GO) aqueous dispersion prepared as described above was diluted to 0.1% by de-ionized water. Then, 32.0 g of the resulting 0.1% graphene oxide aqueous dispersion was added to an aqueous solution of 40.0 g of 2.5% PVA (Aldrich). The resulting mixture was then stirred at room temperature for 10 minutes. The resulting solution was casted onto a Mitsubishi membrane (Mitsubishi International Corporation) by dropping the solution on membrane surface, 0.6 g per 90 cm$^2$. After drying in air, the membrane was put in an oven at 85° C. for 30 minutes to remove water and crosslink the membrane, resulting in a membrane that was 1.4 µm thick with GO/PVA in 3.2/100 by weight as EX-9.

Example 10: Preparation of GO-PVA+LiCl/Stretched PP (EX-10)

4 mg/mL of a graphene oxide (GO) aqueous dispersion prepared as described above was diluted to 0.1% by de-ionized water. Then, 10.0 g of the resulting 0.1% graphene oxide aqueous dispersion was added to a mixture consisting of 40.0 g of 2.5% PVA in water/isopropanol (80/20 v/v) solution (Aldrich). To this mixture, 20.0 g of 1.5% lithium chloride aqueous solution was added. The resulting mixture was stirred at room temperature for 10 minutes. The resulting solution was then tape casted onto a freshly corona treated stretched polypropylene substrate (Celgard 2500, USA) using a casting knife with a gap of 200 µm. After drying in air, the membrane was put in an oven at 85° C. for 30 minutes in order to remove water and crosslink the membrane, resulting in a membrane that was 5 µm thick with GO/LiCl/PVA in 1/30/100 by weight as EX-10.

Example 11: Preparation of GO-PVA+LiCl/Stretched PP-PE-PP (EX-11)

4 mg/mL of a graphene oxide (GO) aqueous dispersion prepared as described above was diluted to 0.1% by de-ionized water. Then, 10.0 g of the resulting 0.1% graphene oxide aqueous dispersion was added to a mixture consisting of 40.0 g of 2.5% PVA in water/isopropanol (80/20 v/v) solution (Aldrich). To this mixture, 20.0 g of 1.5% lithium chloride aqueous solution was added. The resulting mixture was stirred at room temperature for 10 minutes. The resulting solution was then tape casted onto a freshly corona treated stretched polypropylene-polyethylene-polypropylene substrate (Celgard 2340, USA) using a casting knife with a gap of 200 µm. After drying in air, the membrane was put in an oven at 85° C. for 30 minutes in order to remove water and crosslink the membrane, resulting in a membrane that was 5 µm thick with GO/LiCl/PVA in 1/30/100 by weight as EX-11.

Example 12: Preparation of GO-PVA+LiCl/Polyethersulfone (EX-12)

4 mg/mL of a graphene oxide (GO) aqueous dispersion prepared as described above was diluted to 0.1% by de-ionized water. Then, 10.0 g of the resulting 0.1% graphene oxide aqueous dispersion was added to a mixture consisting of 40.0 g of 2.5% PVA in aqueous solution (Aldrich). To this mixture, 20.0 g of 1.5% lithium chloride aqueous solution was added. The resulting mixture was stirred at room temperature for 10 minutes. The resulting solution was then tape casted onto a porous polyethersulfone membrane (Sterlitech, USA) using a casting knife with a gap of 200 µm. After drying in air, the membrane was put in an oven at 85° C. for 30 minutes in order to remove water and crosslink the membrane, resulting in a membrane that was 5 µm thick with GO/LiCl/PVA in 1/30/100 by weight as EX-12.

Preparation of Comparative Examples

1. Preparation of Comparative Example 1 (CE-1): PVA/PET Membrane

A 2.5% PVA aqueous solution (Aldrich) was tape casted onto a 100 µm PET using a casting knife with a gap of 100 µm. After drying in air, the membrane was placed in an oven at 85° C. for 30 minutes to remove water, resulting in a membrane that was 5 µm thick as CE-1.

2. Preparation of Comparative Example 2 (CE-2): PVA/PSF Membrane

A 2.5% PVA aqueous solution (Aldrich) was tape casted onto a 40 µm thick polysulfone with nonwoven fabric substrate (Hydranautics) using a casting knife with a gap of 100 µm. After drying in air, the membrane was placed in an oven at 85° C. for 30 minutes to remove water, resulting in a membrane that was 5 µm thick as CE-2.

3. Preparation of Comparative Example 3 (CE-3): Mitsubishi Membrane

A membrane was cut from an energy recovery ventilator (ERV) by Mitsubishi (Mitsubishi International Corporation, Los Angeles, Calif. USA) as CE-3.

Measurement of Selectively Permeable Elements

EX-1 and CE-1, made as described above were tested for oxygen transmission rate (OTR) as described in ASTM D-3985, at 23° C. and 0% relative humidity (RH) for a period of about 2 days using a MOCON Oxtran 2/21 oxygen permeability Instrument (Morcon, Minneapolis, Minn., USA). The results are shown in Table 1 below.

EX-1 and CE-1, made as described above were also tested for water vapor transmission rate (WVTR) as described in ASTM F1249, at 40° C. and 90% relative humidity (RH) for a period of about 2 days using a MOCON Permatran-W3/33 water vapor permeability Instrument (Mocon). The results are shown in Table 1 below.

TABLE 1

WVTR and $H_2O/O_2$ selectivity of GO-PVA membrane

| Films | Processing Method | WVTR ($g/m^2$ day) (40° C., 90% RH) | OTR ($cc/m^2$ day) (20° C., 0% RH) | $H_2O/O_2$ |
|---|---|---|---|---|
| Ex-1: GO/PVA/PET | Wet coating | 2.3 | <0.005 | >400 |
| CE-1: PVA/PET | Wet coating | 2.3 | 0.05 | 40 |

The results shown in Table 1 demonstrated the significant increase in permeability for the polar water vapor as compared with the non-polar $O_2$ gas.

Ex-2-Ex-12, CE-2 and CE-3 made as described above, were tested for water vapor transmission rate (WVTR) as described in ASTM F1249, at 40° C. and 90% relative humidity (RH) for a period of about 2 days using a MOCON Permatran-W3/33 water vapor permeability Instrument (Mocon). The results are summarized in Table 2 below.

TABLE 2

Water Vapor Permeance, $N_2$ Permeance, $H_2O/O_2$ Selectivity and $H_2O/N_2$ Selectivity of Various membranes.

| MATERIAL | WVTR (g/m² · day) | WV permeability (cm³/cm² · s · cmHg) | WV permeance (g/m² · s · Pa) | $N^2$ permeance (g/m² · s · Pa) | Selectivity ($H_2O/O_2$) | Selectivity ($H_2O/N_2$) |
|---|---|---|---|---|---|---|
| CE-2 PVA/PSF | 1340 | $9.7 \times 10^{-4}$ | $6.1 \times 10^{-6}$ | | $4.1 \times 10^3$ | |
| EX-2 GO + PVA/PSF | 1380 | $1.0 \times 10^{-3}$ | $6.3 \times 10^{-6}$ | | $2.96 \times 10^4$ | |
| EX-3 GO + PVA + LiCl/PSF | 2053 | $2.0 \times 10^{-3}$ | $1.17 \times 10^{-5}$ | | $2.96 \times 10^4$ | |
| EX-4 GO + PVA + LiCl/PVDF | 7274 | | $3.74 \times 10^{-5}$ | $1.3 \times 10^{-10}$ | | $4.3 \times 10^5$ |
| EX-5 PVA + LiCl/PVDF | 7126 | | $3.27 \times 10^{-5}$ | $2.5 \times 10^{-7}$ | | 205 |
| EX-6 GO + PVA + LiCl/Nylon | 8256 | | $3.85 \times 10^{-5}$ | | | |
| EX-7 GO + PVA + PEG/Nylon | 4094 | | $1.72 \times 10^{-5}$ | | | |
| EX-8 GO + PVA + LiCl/PEG/Nylon | 8570 | | $4.19 \times 10^{-5}$ | | | |
| CE-3 Mitsubishi film | 2428 | | $1.7 \times 10^{-5}$ | $5.20 \times 10^{-4}$ | | 0.05 |
| EX-9 Mitsubishi film + GO + PVA | 2698 | | $2.1 \times 10^{-5}$ | $1.9 \times 10^{-7}$ | | 171 |
| EX-10 GO/PVA/LiCl/stretched PP | 8,600 | | $4.6 \times 10^{-5}$ | $7.7 \times 10^{-10}$ | | $9.3 \times 10^4$ |
| EX-11 GO/PVA/LiCl/stretched PP-PE-PP | 7,000 | | $3.74 \times 10^{-5}$ | $5.0 \times 10^{-10}$ | | $1.2 \times 10^5$ |
| EX-12 GO/PVA/LiCl/polyethersulfone | 10,900 | | $5.83 \times 10^{-5}$ | $6.3 \times 10^{-12}$ | | $1.6 \times 10^7$ |

As shown in Table 2, a significant increase in performance can be achieved by using the aforementioned embodiments, even when using a commercial film as the support (EX-9 versus CE-3).

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein may be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A dehydration membrane comprising:
   a support;
   a composite comprising a graphene oxide compound and a polyvinyl alcohol;
   wherein the composite is coated on the support; and
   wherein a first property of the membrane is that the membrane has a moisture permeability of greater than 2 g/m$^2$·day and a second property of the membrane is that the membrane has gas permeability of less than 0.1 cc/m$^2$·day;
   wherein the graphene oxide compound is present at 0.1% to 10% by weight as compared to the weight of the total weight of the graphene oxide compound and the polyvinyl alcohol;
   wherein the composite is in the form of a film having a thickness of 1 to 50 μm; and
   wherein the gas is non-polar.

2. The membrane of claim 1, wherein the gas is inert.

3. The membrane of claim 1, wherein the support is porous.

4. The membrane of claim 1, wherein the support comprises polyamide, polyvinylidene fluoride, polyethylene terephthalate, polysulfone, polyether sulfone, polypropylene, polyethylene, or a mixture thereof.

5. The membrane of claim 1, wherein the graphene oxide compound and polyvinyl alcohol are crosslinked.

6. The membrane of claim 1, wherein the graphene oxide compound is present at about 0.1% to about 10% by weight as compared to the weight of the polyvinyl alcohol.

7. The membrane of claim 1, wherein the graphene oxide compound is graphene oxide, reduced-graphene oxide, functionalized graphene oxide, or functionalized and reduced-graphene oxide.

8. The membrane of claim 1, wherein the graphene oxide compound has a platelet-like particle having a size from about 0.05 μm to about 100 μm.

9. The membrane of claim 1, wherein the composite further comprises lithium chloride.

10. The membrane of claim 1, wherein the composite further comprises polyethylene glycol.

11. The membrane of claim 1, wherein the composite is in the form of a film having a thickness of about 5 μm.

12. A method of dehydrating a first gas, comprising applying a pressure gradient across the dehydration membrane of claim 1 to cause water vapor to selectively pass through the dehydration membrane, wherein the first gas applies a higher pressure to a first side of the membrane than a pressure applied by a second gas to a second side of the membrane, so that water vapor passes through the dehydration membrane from the first gas into the second gas.

13. The method of claim 12, wherein the first gas is inert.

14. The method of claim 12, wherein the first gas is non-polar.

15. The method of claim 12, wherein the first gas is air, oxygen or nitrogen.

16. A device for dehydrating a gas comprising:
   a dehydration membrane of claim 1, wherein the dehydration membrane further comprises a first side of the dehydration membrane disposed opposite to a second side of the dehydration membrane; and
   a chamber configured to contain the gas to be dehydrated which is in fluid communication with the first side of the dehydration membrane;
   wherein the device is configured so that, when the device is in use, the first side of the dehydration membrane is under a higher pressure than the second side of the dehydration membrane.

17. The device of claim 16, wherein the gas to be dehydrated is non-polar.

18. The device of claim 16, wherein the gas to be dehydrated is inert.

19. The device of claim 16, wherein the gas is air, oxygen or nitrogen.

* * * * *